(12) United States Patent
Um et al.

(10) Patent No.: US 8,174,018 B2
(45) Date of Patent: May 8, 2012

(54) DISPLAY DEVICE AND CONTROL METHOD OF THE SAME

(75) Inventors: Yoon-Sung Um, Yongin-si (KR); Jae-Jin Lyu, Yongin-si (KR); Seung-Beom Park, Seoul (KR); Dong-Gi Seong, Seongnam-si (KR); Kang-Woo Kim, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 387 days.

(21) Appl. No.: 12/026,929

(22) Filed: Feb. 6, 2008

(65) Prior Publication Data
US 2008/0246038 A1 Oct. 9, 2008

(30) Foreign Application Priority Data
Apr. 4, 2007 (KR) .......................... 10-2007-0033492

(51) Int. Cl.
*G02F 1/136* (2006.01)
(52) U.S. Cl. ................ 257/72; 349/38; 349/39; 349/139
(58) Field of Classification Search .................... 438/22, 438/24, 48, 69, 493, 503, 507, 956, 30, 128, 438/149, 151, 157, 161, 283; 345/690, 694, 345/695; 257/59, 72, 83, 84, 88, 89, 98, 257/99, 184, 187, 257–258; 349/43
See application file for complete search history.

(56) References Cited

U.S. PATENT DOCUMENTS

| 6,417,830 | B1 * | 7/2002 | Byeon, II ....................... 345/99 |
| 2002/0047852 | A1 * | 4/2002 | Inukai et al. ................... 345/629 |
| 2005/0231673 | A1 * | 10/2005 | Yamazaki et al. ............. 349/139 |
| 2005/0280749 | A1 * | 12/2005 | Jung et al. ........................ 349/43 |
| 2006/0215066 | A1 * | 9/2006 | Ueda et al. ...................... 349/38 |
| 2008/0007506 | A1 * | 1/2008 | Chen et al. ...................... 345/92 |
| 2008/0049155 | A1 * | 2/2008 | Yagi et al. ....................... 349/39 |
| 2009/0051641 | A1 * | 2/2009 | Irie et al. ......................... 345/96 |

FOREIGN PATENT DOCUMENTS

| JP | 2003186452 | 7/2003 |
| JP | 2005316211 | 11/2005 |
| KR | 1020060085012 | 7/2006 |

\* cited by examiner

*Primary Examiner* — Marcos D. Pizarro
*Assistant Examiner* — Suian Tang
(74) *Attorney, Agent, or Firm* — H.C. Park & Associates, PLC

(57) ABSTRACT

A display device including a first gate line and a second gate line that extend in parallel with each other, a data line crossing the first and second gate lines to form a pixel region, a pixel electrode in the pixel region and including a main pixel electrode and a sub pixel electrode, which are connected to the first gate line and the data line, a control thin film transistor connected to the second gate line and the sub pixel electrode, and a gate driver. The gate driver outputs a first gate signal to the first gate line and a second gate signal to the second gate line. The first gate signal activates the first gate line during a first time and a second time following the first time, and the second gate signal activates the second gate line during the first time but not the second time.

15 Claims, 13 Drawing Sheets

DISPLAY DEVICE AND CONTROL METHOD OF THE SAME

CROSS-REFERENCE TO RELATED APPLICATIONS

This application claims priority from and the benefit of Korean Patent Application No. 10-2007-0033492, filed on Apr. 4, 2007, which is hereby incorporated by reference for all purposes as if fully set forth herein.

BACKGROUND OF THE INVENTION

1. Field of the Invention

The present invention relates to a display device and a control method of the same, and more particularly, to a liquid crystal display device including a plurality pixel electrodes having different transmittances.

2. Discussion of the Background

A liquid crystal display device includes a liquid crystal display (LCD) panel. The LCD panel includes a first substrate having a thin film transistor, a second substrate opposing the first substrate, and a liquid crystal layer interposed between the first and second substrates. Because the LCD panel is not self-emissive, a backlight unit may be disposed behind the thin film transistor substrate to emit light.

Although the LCD panel may be thin and small, and it consumes less power than other display devices, it may have a narrow viewing angle. A patterned vertically aligned (PVA) mode LCD panel has been developed to improve the narrow viewing angle. The PVA mode panel includes a cutting pattern that is respectively formed in a pixel electrode and a common electrode. In the PVA mode, liquid crystals are vertically aligned without application of an electric field, and a phase retardation value of light passing the liquid crystals drastically varies depending on the viewing angle in front and lateral views. In the lateral view, a liquid crystal director distortion may increase gamma distortion, which raises brightness in a low gray scale, lowers visibility, and decreases contrast ratio.

To solve the foregoing problem, a super-PVA (SPVA) mode has been developed, in which a pixel electrode is divided into a main pixel electrode and a sub pixel electrode, which receive different voltages. In a coupling capacitance mode, which controls electric capacitance to supply different voltages, among the SPVA mode, both transmittance and visibility may be lower than those in a mode having individual thin film transistors to supply different voltages.

SUMMARY OF THE INVENTION

The present invention provides a display device that may improve visibility and transmittance, and a control method of the same.

Additional aspects and/or advantages of the present invention will be set forth in part in the description which follows and, in part, will be obvious from the description, or may be learned by practice of the present invention.

The present invention discloses a display device, including a first gate line and a second gate line that extend in parallel with each other, a data line crossing the first and second gate lines and forming a pixel region with the first gate line and the second gate line, and a pixel electrode disposed in the pixel region and including a main pixel electrode and a sub pixel electrode. The main pixel electrode and the sub pixel electrode are connected to the first gate line and the data line. A control thin film transistor is connected to the second gate line and the sub pixel electrode. A gate driver outputs a first gate signal to the first gate line and a second gate signal to the second gate line. The first gate signal activates the first gate line during a first time and a second time following the first time, and the second gate signal activates the second gate line during the first time but not the second time.

The present invention also discloses a method of controlling a display device that includes a first gate line and a second gate line extending in parallel with each other, a data line crossing the first and second gate lines, a pixel electrode having a main pixel electrode and a sub pixel electrode connected to the first gate line and the data line, and a control thin film transistor connected to the second gate line and the sub pixel electrode. The method includes generating a control voltage according to a gray scale of an image signal to change a transmittance ratio of the sub pixel electrode to the main pixel electrode, supplying a first gate signal to the first gate line to activate the first gate line during a first time and a second time following the first time, supplying a second gate signal to the second gate line to activate the second gate line during the first time but not the second time, supplying the control voltage to the data line during the first time, and supplying a data voltage to the data line during the second time.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention, and together with the description serve to explain the principles of the invention.

DETAILED DESCRIPTION OF THE ILLUSTRATED EMBODIMENTS

Figure 1:
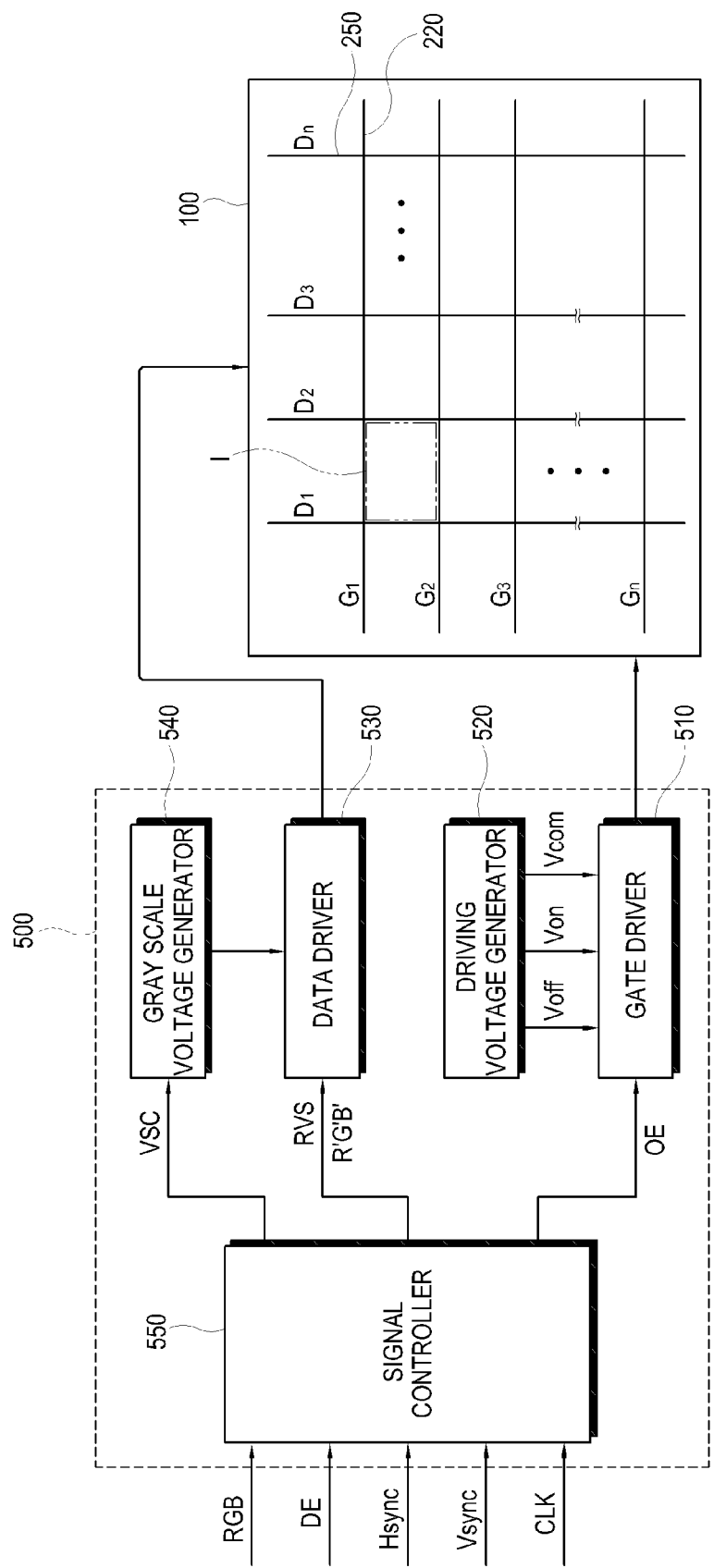
FIG. 1 is a block diagram of a display device according to an exemplary embodiment of the present invention.

The invention is described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure is thorough, and will fully convey the scope of the invention to those skilled in the art. In the drawings, the size and relative sizes of layers and regions may be exaggerated for clarity. Like reference numerals in the drawings denote like elements.

It will be understood that when an element or layer is referred to as being "on" or "connected to" another element or layer, it can be directly on or directly connected to the other element or layer, or intervening elements or layers may be present. In contrast, when an element is referred to as being "directly on" or "directly connected to" another element or layer, there are no intervening elements or layers present.

FIG. 1 is a block diagram of a display device according to an exemplary embodiment of the present invention.

As shown therein, a display device according to the present exemplary embodiment includes a display panel 100 and a panel driver 500, which drives the display panel 100. A plurality of pixels I is formed in the display panel 100 in a matrix. The display panel 100 includes a liquid crystal panel including a first substrate, a second substrate, and a liquid crystal layer interposed between the first and second substrates (to be described below). The display panel 100 is not limited to the liquid crystal panel. Embodiments of the present invention may be applicable to other display panels as long as they include a thin film transistor substrate having the plurality of pixels I and a panel driver to drive the thin film transistor substrate. For example, in another exemplary embodiment, a display panel may include an organic light emitting diode (OLED) panel having an organic light emitting layer. The panel driver 500 includes a gate driver 510, a driving voltage generator 520, a data driver 530, a gray scale voltage generator 540, and a signal controller 550, which controls the foregoing elements.

Figure 2:
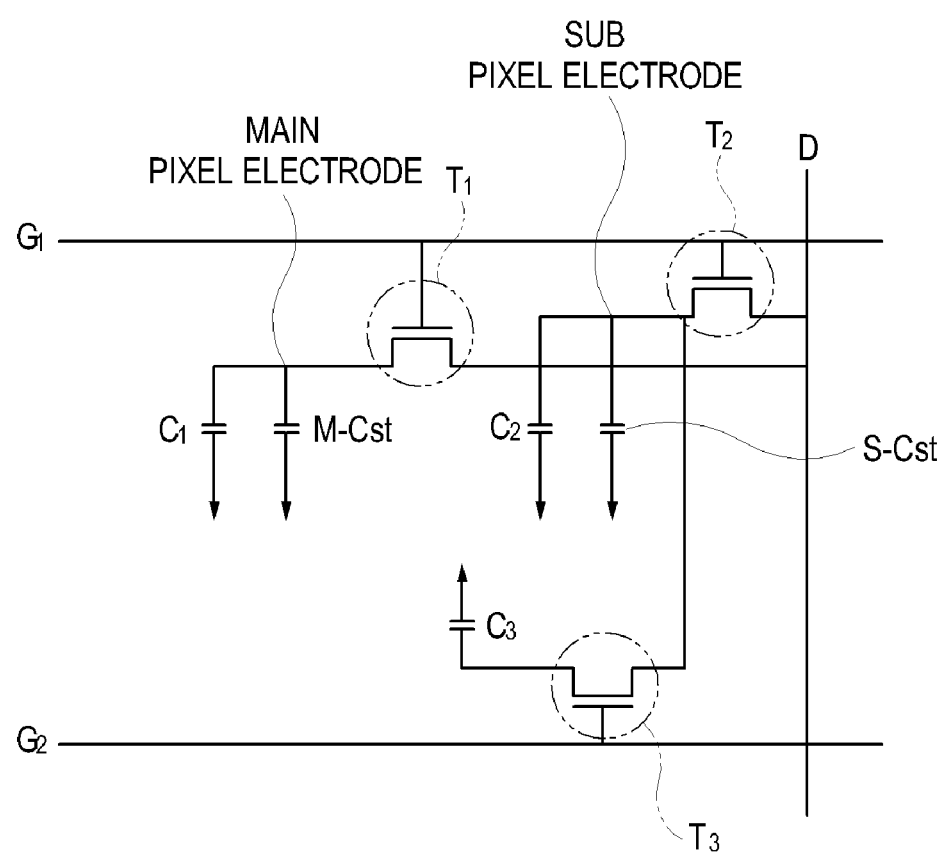
FIG. 2 is an equivalent circuit diagram of a pixel in the display device of FIG. 1.

FIG. 2 is an equivalent circuit diagram of a pixel I according to the present exemplary embodiment. As shown therein, a single pixel I includes a first gate line G1 and a second gate line G2, which extend in parallel with each other, and a data line D, which crosses the first and second gate lines G1 and G2. The pixel I includes three thin film transistors T1, T2, and T3. Control terminals of the first and second thin film transistors T1 and T2 are connected to the first gate line G1. A control terminal of the third thin film transistor T3 is connected to the second gate line G2. Input terminals of the first and second thin film transistors T1 and T2 are connected to the data line D, and an input terminal of the third thin film transistor T3 is connected to an output terminal of the second thin film transistor T2. Output terminals of the first and second thin film transistors T1 and T2 are respectively connected to different pixel electrodes to supply particular voltages to the liquid crystal layer. The first thin film transistor T1 is connected to a main pixel electrode and forms a main liquid crystal capacitor M-Cst. The second thin film transistor T2 is connected to a sub pixel electrode and forms a sub liquid crystal capacitor S-Cst. The first and second thin film transistors T1 and T2 are respectively connected to a first storage capacitor C1 and a second storage capacitor C2 to sustain liquid crystal capacitance.

An input terminal of the third thin film transistor T3 is connected to the output terminal of the second thin film transistor T2, and an output terminal of the third thin film transistor T3 is connected to a third storage capacitor C3.

Figure 3A:
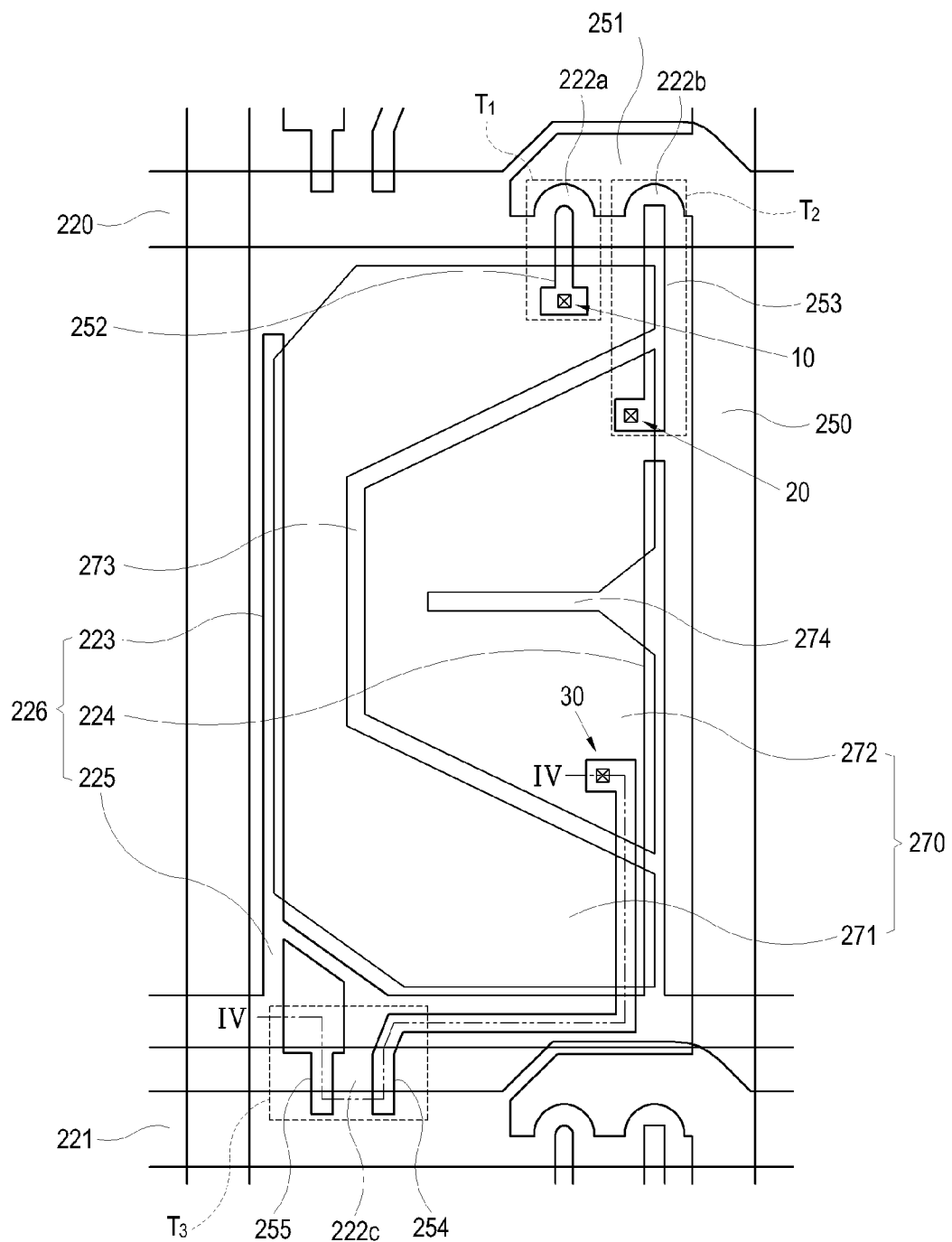
FIG. 3A is a plan view of the pixel in the display device of FIG. 1.
Figure 3B:
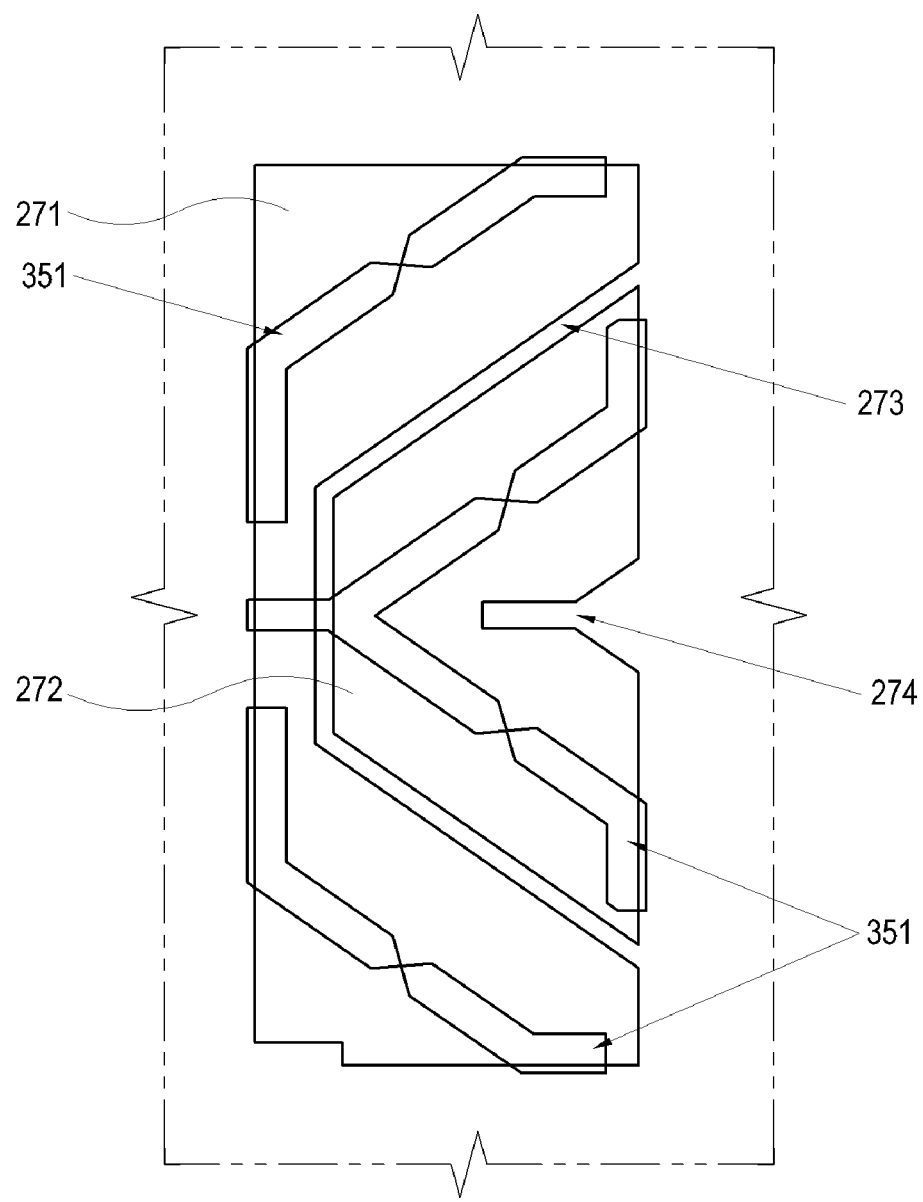
FIG. 3B shows a common electrode cutting pattern of the display device of FIG. 1.
Figure 4:
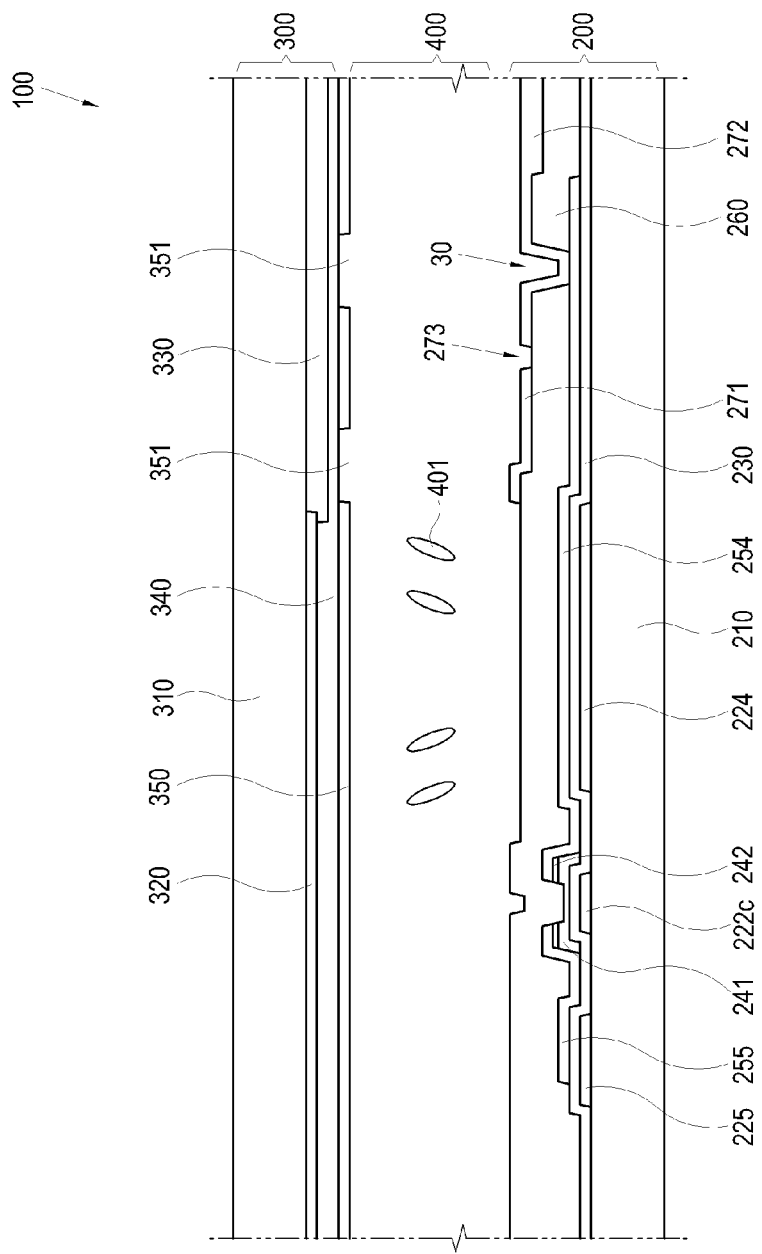
FIG. 4 is a cross-sectional view taken along line IV-IV of FIG. 3A.

Referring to FIG. 3A, FIG. 3B, and FIG. 4, the pixel I, which is formed in the display panel 100, will be described in detail. FIG. 3A is a plan view of the pixel I according to the present exemplary embodiment. FIG. 3B shows a common electrode cutting pattern of the pixel I. FIG. 4 is a cross-sectional view of the pixel I taken along line IV-IV of FIG. 3A. The single pixel I is defined as a pixel domain that is formed by a first gate line 220, a second gate line 221, and a data line 250, and has a rectangular shape. As described above, the single pixel I includes three thin film transistors T1, T2, and T3. The first thin film transistor T1 drives a main pixel electrode 271, the second thin film transistor T2 drives a sub pixel electrode 272, and the third thin film transistor T3 is a control thin film transistor that controls the main pixel electrode 271 and the sub pixel electrode 272 to have different transmittance.

A first substrate 200 will be described below.

Gate wires 220, 221, 222a, 222b, 222c, and 226 are formed on a first insulating substrate 210. The gate wires 220, 221, 222a, 222b, 222c, and 226 may include single or multiple metal layers. The gate wires 220, 221, 222a, 222b, 222c, and 226 include a first gate line 220 and a second gate line 221, which extend transversely, gate electrodes 222a, 222b, and 222c, which are connected to the first and second gate lines 220 and 221, and a storage electrode pad 226, which overlaps other metal layers and forms a storage capacitor. The gate electrodes 222a, 222b, and 222c include the first gate electrode 222a of the first thin film transistor T1, the second gate electrode 222b of the second thin film transistor T2, and the third gate electrode 222c of the third thin film transistor T3. The first gate electrode 222a and the second gate electrode 222b may be part of the first gate line 220 or a part extending from the first gate line 220. The third gate electrode 222c is a part of the second gate line 221.

The storage electrode pad 226 includes a first storage electrode pad 223, which overlaps the main pixel electrode 271 and forms the first storage capacitor C1, a second storage electrode pad 224, which overlaps the sub pixel electrode 272 and forms the second storage capacitor C2, and a third storage electrode pad 225, which overlaps a drain electrode 255 of the third thin film transistor T3 and forms the third storage capacitor C3. The first and second storage electrode pads 223 and 224 are partly formed in parallel with the data line 250. The storage electrode pad 226 may have various shapes and positions.

A gate insulating layer 230, which may include silicon nitride (SiNx), covers the gate wires 220, 221, 222a, 2222b, 222c, and 226 on the first insulating substrate 210.

A semiconductor layer 241, which may include amorphous silicon, is formed on the gate insulating layer 230 of the gate electrodes 222a, 222b, and 222c. An ohmic contact layer 242, which may include silicide or n+ hydrogenated amorphous silicon highly doped with an n-type dopant, is formed on the semiconductor layer 241. Referring to the third thin film transistor in FIG. 4, the ohmic contact layer 242 is removed from a channel region between a source electrode 254 and the drain electrode 255.

Data wires 250, 251, 252, 253, 254, and 255 are formed on the ohmic contact layer 242 and the gate insulating layer 230. The data wires 250, 251, 252, 253, 254, and 255 may also include single or multiple metal layers. The data wires 250, 251, 252, 253, 254, and 255 include the data line 250, which is formed vertically and crosses the gate lines 220 and 221 to form the pixel I, the source electrodes 251 and 254, and drain electrodes 252, 253, and 255, which are separated from the source electrodes 251 and 254 and partly formed on the ohmic contact layer 242.

A first source electrode 251, which corresponds to the input terminal of the first and second thin film transistors T1 and T2, is branched from the data line 250 and is formed on the pixel I. A second source electrode 254, which corresponds to the input terminal of the third thin film transistor T3, extends to the sub pixel electrode 272 from the third gate electrode 222c.

The first drain electrode 252 is connected to the main pixel electrode 271 through a first contact hole 10, and the second drain electrode 253 is connected to the sub pixel electrode 272 through a second contact hole 20. The third drain electrode 255 is connected to the third storage electrode pad 225 through the third storage capacitor C3 without a contact hole, leaving the gate insulating layer 230 therebetween.

A passivation layer 260 is formed on the data wires 250, 251, 252, 253, 254, and 255 and the portion of the semiconductor layer 241 exposed by the data wires 250, 251, 252, 253, 254, and 255. Contact holes 10, 20, and 30 are formed in the passivation layer 260 to expose the first drain electrode 252, the second drain electrode 253, and the second source electrode 254, respectively. The passivation layer 260 may include an organic layer, an inorganic layer, or multiple layers including an organic layer and an inorganic layer. If the single pixel I includes a plurality of pixel electrodes such as the main pixel electrode 271 and the sub pixel electrode 272, the passivation layer 260 generally includes a thick organic layer, thereby preventing electric interruption between the gate and data wires driving the plurality of pixel electrodes, and the pixel electrodes. Here, however, FIG. 4 shows the single layered gate line 220 and data line 250 are provided to drive the main pixel electrode 271 and the sub pixel electrode 272. Thus, the passivation layer 260 may include an inorganic layer only.

A pixel electrode 270 is formed on the passivation layer 260. The pixel electrode 270 typically includes a transparent conductive material such as indium tin oxide (ITO), indium zinc oxide (IZO), etc. The pixel electrode 270 includes the main pixel electrode 271, which is connected to the first drain electrode 252 through the first contact hole 10, and the sub pixel electrode 272, which is connected to the second drain electrode 253 through the second contact hole 20. The sub pixel electrode 272 is also connected to the second source electrode 254 of the third thin film transistor T3 through the third contact hole 30.

The main pixel electrode 271 is separated from the sub pixel electrode 272 by a first pixel electrode cutting pattern 273. A second pixel electrode cutting pattern 274 is formed in the sub pixel electrode 272. The first pixel electrode cutting pattern 273 is inclined approximately 45° or 135° with respect to the gate lines 220 and 221. The second pixel electrode cutting pattern 274 is formed in parallel with the gate lines 220 and 221. The pixel electrode cutting patterns 273 and 274, together with a common electrode cutting pattern 351 (described below), divide the liquid crystal layer 400 into a plurality of domains, thereby improving a viewing angle.

The second substrate 300 will be described below.

A black matrix 320 is formed on a second insulating substrate 310. The black matrix 320 defines red, green, and blue filters, and it blocks light from being directly emitted to the thin film transistors of the first substrate 200. The black matrix 320 typically includes an organic photoresist material added with a black pigment. The black pigment may include carbon black or titanium oxide.

A color filter layer 330 includes red, green, and blue filters, which are repeatedly formed between the black matrixes 320. The color filter layer 330 assigns color to light that is emitted from a backlight unit (not shown) and passes through the liquid crystal layer 400. The color filter layer 330 typically includes an organic photoresist material.

An overcoat layer 340 is formed on the color filter layer 330 and the black matrixes 320 that are not covered by the color filter layer 330. The overcoat layer 340 provides a planar surface and protects the color filter layer 330. The overcoat layer 340 may include a photoresist acrylic resin.

The common electrode 350 is formed on the overcoat layer 340. The common electrode 350 includes a transparent conductive material such as ITO, IZO, etc. The common electrode 350, together with the pixel electrode 270, supplies a voltage to the liquid crystal layer 400. The common electrode cutting pattern 351 is formed in the common electrode 350 to be parallel with the inclined first pixel electrode cutting pattern 273, i.e. it is inclined 45° or 135° with respect to the gate lines 220 and 221. The common electrode cutting pattern 351, together with the pixel electrode cutting patterns 273 and 274, divide the liquid crystal layer 400 into a plurality of domains.

The pixel electrode cutting patterns 273 and 274 and the common electrode cutting pattern 351 may have various arrangements.

The liquid crystal layer 400, which includes liquid crystal molecules 401, is disposed between the first and second substrates 200 and 300. The liquid crystal layer 400 has a vertically aligned (VA) mode in which a long axis of the liquid crystal molecule 401 is perpendicular to the first and second substrates 200 and 300 if not receiving a voltage. If voltage is supplied, the long axis of the liquid crystal molecule 401 lies vertically with respect to an electric field due to negative dielectric anisotropy. Without the pixel electrode cutting patterns 273 and 274 and the common electrode cutting pattern 351, the liquid crystal molecule 401 may be irregularly arranged since the angle of lying direction is not determined, thereby creating a disclination line on a boundary between different lying directions. The pixel electrode cutting patterns 273 and 274 and the common electrode cutting pattern 351 form a fringe field and determine the lying direction of the liquid crystal molecules 401 if voltage is supplied to the liquid crystal layer 400. The liquid crystal layer 400 is divided into a plurality of domains according to an arrangement of the pixel electrode cutting patterns 273 and 274 and the common electrode cutting pattern 351. Thus, a wide viewing angle may be realized and visibility may also improve. Thus, the display panel 100 according to the present exemplary embodiment may minimize light leakage and enhance contrast ratio.

Returning to FIG. 1, the panel driver 500 will be described below.

The driving voltage generator 520 generates a gate on voltage Von and a gate off voltage Voff to turn the thin film transistors T1, T2, and T3 on and off, and a common voltage Vcom to be supplied to the common electrode 350.

The gray scale voltage generator 540 generates a plurality of gray scale voltages, which are related to brightness of the display device.

The gate driver 510 may be referred to as a scan driver. The gate driver 510 is connected to the gate lines 220 and 221 and supplies the gate on voltage Von and the gate off voltage Voff from the driving voltage generator 520 to the gate lines 220 and 221.

The data driver 530 may be referred to as a source driver. The data driver 530 receives a gray scale voltage from the gray scale voltage generator 540 and supplies the gray scale voltage, selected by a control of a signal controller 550, to the data line 250.

The signal controller 550 receives red, green, and blue (RGB) gray scale signals R, G, and B and an input control signal to control displaying the RGB gray scale signals R, G, and B, e.g. a vertical synchronizing signal Vsync, a horizontal synchronizing signal Hsync, a main clock signal CLK, a data enable signal DE, etc., from an external graphics controller. The signal controller 550 generates a gate control signal, a data control signal, and a voltage selection control signal VSC based on the input control signal. The signal controller 550 converts the gray scale signals R, G, and B properly and outputs the gate control signal to the gate driver 510. The signal controller 550 outputs the data control signal and the converted gray scale signals R', G', and B' to the data driver 530, and outputs the voltage selection control signal VSC to the gray scale voltage generator 540.

The gate control signal includes a vertical synchronization start signal STV to start outputting a gate on pulse (high region of gate signal), a gate clock signal to control an output time of the gate on pulse, and a gate on enable signal OE to limit a width of the gate on pulse. The data control signal includes a horizontal synchronization start signal STH to start inputting the gray scale signal, a load signal (LOAD or TP) to supply a data voltage to the data line 250, a reverse control signal RVS to reverse a polarity of the data voltage, and a data clock signal HCLK.

Figure 5:
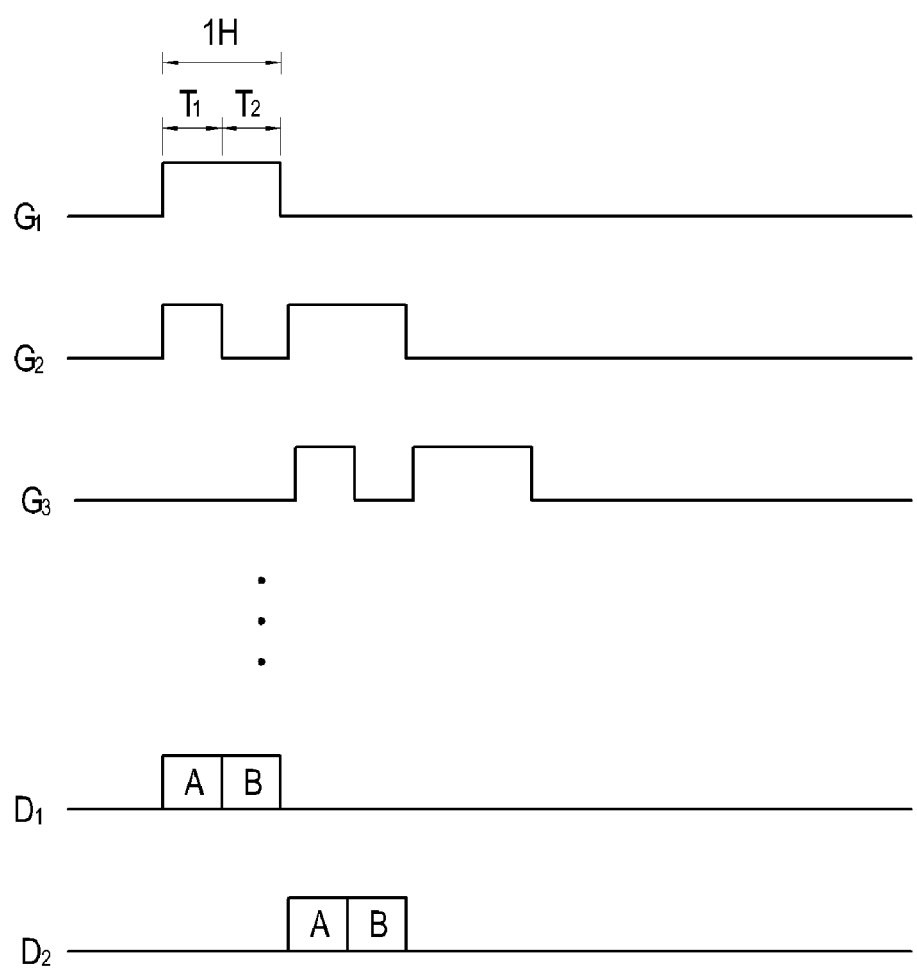
FIG. 5 shows a signal wave form to explain a control method of the display device of FIG. 1.

Hereinafter, a method of controlling the display device according to the present exemplary embodiment will be described below with reference to FIG. 5, FIG. 6, FIG. 7, FIG. 8, FIG. 9, and FIG. 10. FIG. 5 shows a signal wave form to explain the control method according to the present exemplary embodiment.

Referring to FIG. 5, the gate driver 510 simultaneously supplies a gate signal to two adjacent gate lines along the extension direction of the data line 250, i.e. to both the first gate line G1 and the second gate line G2. If 1H refers to a gate on pulse region in a gate signal supplied to the gate line, the gate signal having 1H is typically sequentially supplied from the first gate line G1 to the last gate line Gn. However, according to the present exemplary embodiment, the gate driver 510 supplies a gate signal to the first and second gate lines G1 and G2 to activate the first and second gate lines G1 and G2 during a first time $T_1$, which is smaller than 1H, and activates only the first gate line G1 during the subsequent remaining second time $T_2$ of the 1H period. That is, the first gate line G1 receives a standard gate signal while the second gate line G2 receives a gate signal having a smaller on-region than the gate signal supplied to the first gate line G1. Thus, the second gate line G2 is simultaneously activated together with the first gate line G1, and then it is turned off and deactivated after the first time $T_1$.

The data driver 530 supplies a control voltage A to the pixel I connected to the first and second gate lines G1 and G2 during the first time $T_1$, and supplies a data voltage B to the pixel I connected to the first gate line G1 during the second time $T_2$. The control voltage A controls a transmittance ratio of the sub pixel electrode 272 to the main pixel electrode 271, and includes overall voltage levels that the data voltage B may have.

During the first time $T_1$ of the next 1H period, in which the second and third gate lines G2 and G3 are simultaneously activated, the control voltage A is supplied to the pixel I connected to the second and third gate lines G2 and G3. During the second time $T_2$ in which only the second gate line G2 is activated, the data voltage B is supplied to the pixel I connected to the second gate line G2.

The pixel I in FIG. 3 will be described in detail by way of example. When the first and second gate lines 220 and 221 are simultaneously activated during the first time $T_1$, the control voltage A is supplied to the main pixel electrode 271, the sub pixel electrode 272, and to the third storage capacitor C3, which includes the drain electrode 255 of the third thin film transistor T3 and the third storage electrode pad 225. Then, during the second time $T_2$ at which the first gate line 220 is activated and the second gate line 221 is turned off, the data voltage B is supplied to the main pixel electrode 271 and the sub pixel electrode 272. Here, the main pixel electrode 271 and the sub pixel electrode 272 receive equivalent voltages, thereby presenting equivalent transmittance. Then, if the second gate line 221 and a third gate line (not shown) disposed subsequent to the second gate line 221 are simultaneously activated, the third thin film transistor T3 is turned on by the second gate line 221. The data voltage B is transmitted from the sub pixel electrode 272 to the third drain electrode 255, an output terminal, through the second source electrode 254 serving as an input terminal of the third thin film transistor T3. With the foregoing mechanism, a voltage corresponding to an intermediate level between the data voltage B and the control voltage A is formed in the sub pixel electrode 272. That is, a voltage formed in the sub pixel electrode 272 differs from the data voltage supplied to the main pixel electrode 271, and the transmittance of the main and sub pixel electrodes 271 and 272 may be differently controlled. The different voltages may decrease a gamma curve difference in front and lateral views, thereby improving visibility.

That is, the display device according to the present exemplary embodiment simultaneously activates two gate lines and supplies the control voltage A to pixels corresponding thereto, and then supplies the normal data voltage B to pixels corresponding to one of the two gate lines, thereby supplying different voltages to the main pixel electrode 271 and the sub pixel electrode 272.

Figure 6:
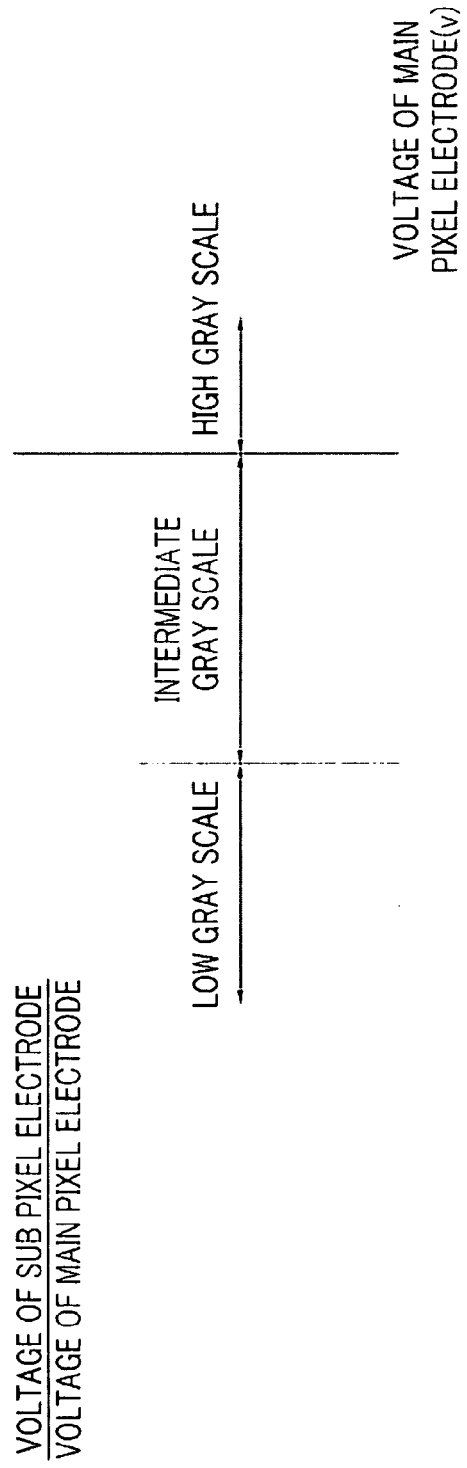
FIG. 6 is a graph to explain a transmittance of the display device of FIG. 1.

FIG. 6 is a graph to explain transmittance of the display device. The X axis represents a voltage supplied to the main pixel electrode 271, and the Y axis represents a ratio of a voltage supplied to the sub pixel electrode 272 to a voltage supplied to the main pixel electrode 271. If the voltage ratio of the sub pixel electrode 272 to the main pixel electrode 271 has a shape as shown in FIG. 6, the display device may provide good visibility. Even though the level of the voltage supplied to the sub pixel electrode 272 is not proportional to the transmittance of light passing the pixel electrode 270, transmittance typically increases as a voltage supplied to the pixel electrode 270 grows. In the present exemplary embodiment, the difference of the voltage supplied to the pixel electrode 270 is regarded as the difference of transmittance. As the gray scale of an image signal increases as the transmittance rises, the data voltage supplied to the pixel electrode 270, the transmittance and the gray scale of the image signal have similar proportional relations to each other.

Typically, the liquid crystal molecules 401 respond if they receive approximately 2V or more. Thus, transmittance is almost zero percent with respect to a voltage lower than 2V. In the present exemplary embodiment, the lowest transmittance refers to zero % percent while the highest transmittance refers to 100%. In the liquid crystal layer 400 that provides the highest transmittance if receiving 7V, an image signal in a low gray scale is displayed in the pixel I if a voltage ranging from 0V to 2.5V is supplied to the liquid crystal layer 400. If 6V to 7V is supplied to the liquid crystal layer 400, an image signal in a high gray scale is displayed in the pixel I. If a voltage ranging between 2.5V and 6V is supplied to the liquid crystal layer 400, an image signal in an intermediate gray scale is displayed on the pixel I. In the present exemplary embodiment, the intermediate gray scale has 0% to 80% transmittance, preferably 10% to 80% transmittance. The low gray scale has 0% to 10% transmittance while the high gray scale has 80% to 100% transmittance. The transmittance of the high, intermediate, and low gray scales may be adjusted to have various values depending on features of the liquid crystal layer 400.

As shown therein, the voltage ratio, i.e. the transmittance ratio of the sub pixel electrode 272 to the main pixel electrode 271, may be adjusted depending on a gray scale of an image signal. In case of a low gray scale, which represents black, and a high gray scale, which represents white, the transmittance ratio of the sub pixel electrode 272 to the main pixel electrode 271 may be around 1. In the intermediate gray scale, the transmittance ratio of the sub pixel electrode 272 to the main pixel electrode 271 may be controlled in a range of 0.5 to 0.9. That is, the transmittance ratio of the sub pixel electrode 272 to the main pixel electrode 271 in the intermediate gray scale is smaller than those in the high and low gray scales. Particularly, the transmittance ratio of the sub pixel electrode 272 to the main pixel electrode 271 in the intermediate gray scale having approximately 40% to 60% transmittance is smaller than those in the high and low gray scales.

Figure 7:
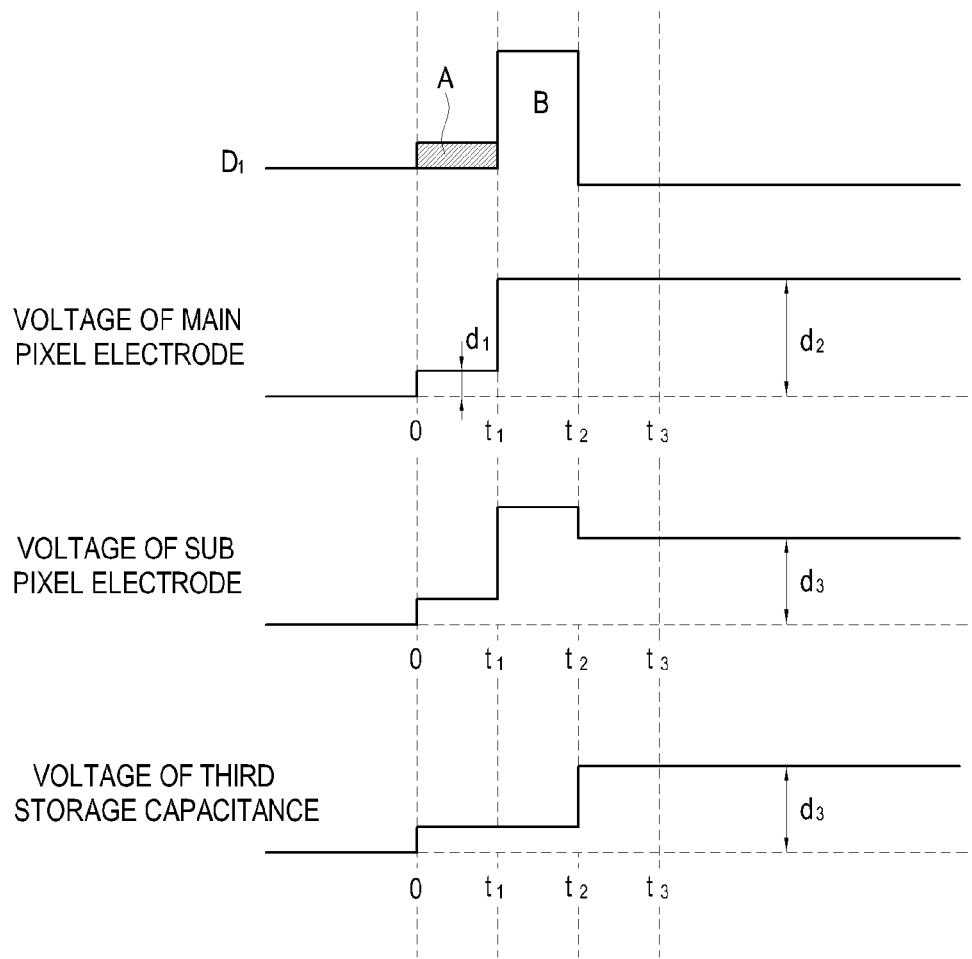
FIG. 7 shows a pixel voltage according to a first exemplary embodiment of the display device of FIG. 1.

FIG. 7 illustrates a pixel voltage according to a first exemplary embodiment of the display device, and explains a control voltage controlling the transmittance ratio of the sub pixel electrode 272 to the main pixel electrode 271 when supplying an intermediate gray scale data voltage. When an image signal is supplied, the signal controller 550 determines the transmittance ratio between the main and sub pixel electrodes 271 and 272 based on the gray scale of the image signal. The transmittance ratio of the sub pixel electrode 272 to the main pixel electrode 271 may be determined through the graph in FIG. 6. The signal controller 550 generates a control voltage A to be supplied to the main and sub pixel electrodes 271 and 272 according to the transmittance ratio therebetween. Then, the signal controller 550 controls the gate driver 510 and the data driver 530 to supply the set control voltage A and the data voltage B of the normal image signal to the pixel I. Hereinafter, a pixel voltage refers to a voltage stored in the main and sub pixel electrodes 271 and 272.

If the gray scale of the image signal corresponds to the intermediate gray scale in FIG. 6, the transmittance ratio, i.e. the voltage ratio between the main pixel electrode 271 and the sub pixel electrode 272, may be 0.5 to 0.9. The pixel voltage, which is charged to the sub pixel electrode 272 by the control voltage A, has a lower level than the data voltage supplied to the main pixel electrode 271. More specifically, the difference between the common voltage as a reference voltage and the control voltage A is set lower than that between the common voltage and the data voltage B in consideration of the data voltage B for inversion driving. The control voltage A lowers the pixel voltage of the sub pixel electrode 272 due to the difference from the data voltage B supplied to the sub pixel electrode 272. If an average value of the control voltage A and the data voltage B is defined as a compensation value, the voltage ratio of the sub pixel electrode 272 to the main pixel electrode 271, i.e. the transmittance ratio, may be set as the compensation value with respect to the data voltage B.

For example, if the voltage ratio of the sub pixel electrode 272 to the main pixel electrode 271 is 0.5, a 0V control voltage A is supplied with respect to a 5V data voltage B. The pixel voltage stored in the sub pixel electrode 272 becomes 2.5V, the compensation value as the average value of the data voltage B and the control voltage A, corresponding to half of 5V, which is the data voltage B stored in the main pixel electrode 271.

Referring to FIG. 7, the control voltage A, which is lower than the data voltage B, and the data voltage B are supplied to the pixel electrodes 271 and 272 by a gate signal supplied to the first and second gate lines 220 and 221. A pixel voltage at a first level d1 is stored in the main pixel electrode 271 by the control voltage A during the first time $0 \sim T_1$, and then a pixel voltage at a second level d2 is stored in a single frame by the data voltage B subsequently input after $T_1$.

The pixel voltage at the first level d1 is stored in the sub pixel electrode 272 by the control voltage A, and then the pixel voltage is raised to the second level d2 by the data voltage B during the second time $T_1 \sim T_2$. If the third thin film transistor T3 is turned on by the second gate line 221 turned on during the third time $T_2 \sim T_3$, the voltage of the sub pixel electrode 272 changes to the third level d3 due to the difference from the control voltage A supplied to the third storage capacitor C3. The third level d3 corresponds to the compensation value, which is the average value of the data voltage B and the control voltage A. The ratio of the third level d3 to the second level d2 controls the transmittance ratio of the sub pixel electrode 272 to the main pixel electrode 271.

The third storage capacitor C3, which is connected to the third thin film transistor T3, stores a voltage at the first level d1 until the second time $T_2$ by the control voltage A supplied during the first time $0 \sim T_1$. If the data voltage B of the sub pixel electrode 272 is supplied at the third time $T_3$, the first level d1 changes into the third level d3. The third thin film transistor T3 discharges the data voltage B stored in the sub pixel electrode 272 to differently control the pixel voltage of the sub pixel electrode 272 and the pixel voltage of the main pixel electrode 271.

The first time $0 \sim T_1$ at which the control voltage A is supplied is shorter than the overall gate on pulse region 1H, and may be set as approximately 0.1 to 0.9 times the gate on pulse region 1H. The first time $0 \sim T_1$ may vary depending on desired visibility and charging rate of the liquid crystal layer.

Figure 8:
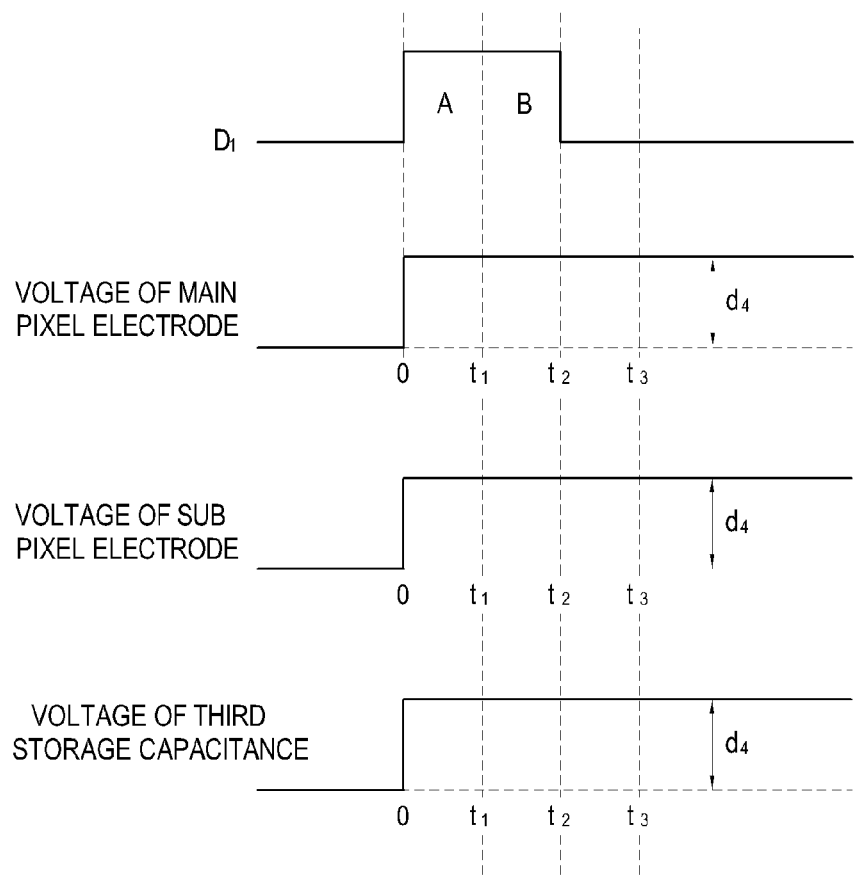
FIG. 8 shows a pixel voltage according to a second exemplary embodiment of the display device of FIG. 1.

FIG. 8 shows a pixel voltage according to a second exemplary embodiment of the display device, and explains a control voltage that controls a transmittance ratio of the sub pixel electrode 272 to the main pixel electrode 271 when supplying a high gray scale data voltage.

As shown therein, if a high gray scale data voltage, i.e. with 80% to 100% transmittance, is supplied to a pixel I, a control voltage A may have the same level as a data voltage B. Thus, a voltage of the main pixel electrode 271, the sub pixel electrode 272, and the third storage capacitor C3 maintain a fourth level d4 in a single frame. The range of the high gray scale may be differently controlled as described above. According to another exemplary embodiment, if a data voltage corresponding to 90% to 100% transmittance is supplied to a pixel I, a control voltage A, which is equivalent to the data voltage B, may be supplied thereto.

To display an image signal in a low gray scale having 0% to 10% transmittance, the control voltage A in FIG. 7 or the control voltage A in FIG. 8 may be supplied. In case of the data voltage B having a low transmittance, the control voltage A may have the same level as the data voltage B or may have a level that is set low. As described above, if the transmittance is low, the liquid crystal molecules 401 move slowly. Thus, the control voltage A may not significantly affect the data voltage B. There is not a significant impact on the transmittance even if the control voltage A equivalent to the data voltage B is supplied.

Figure 9:
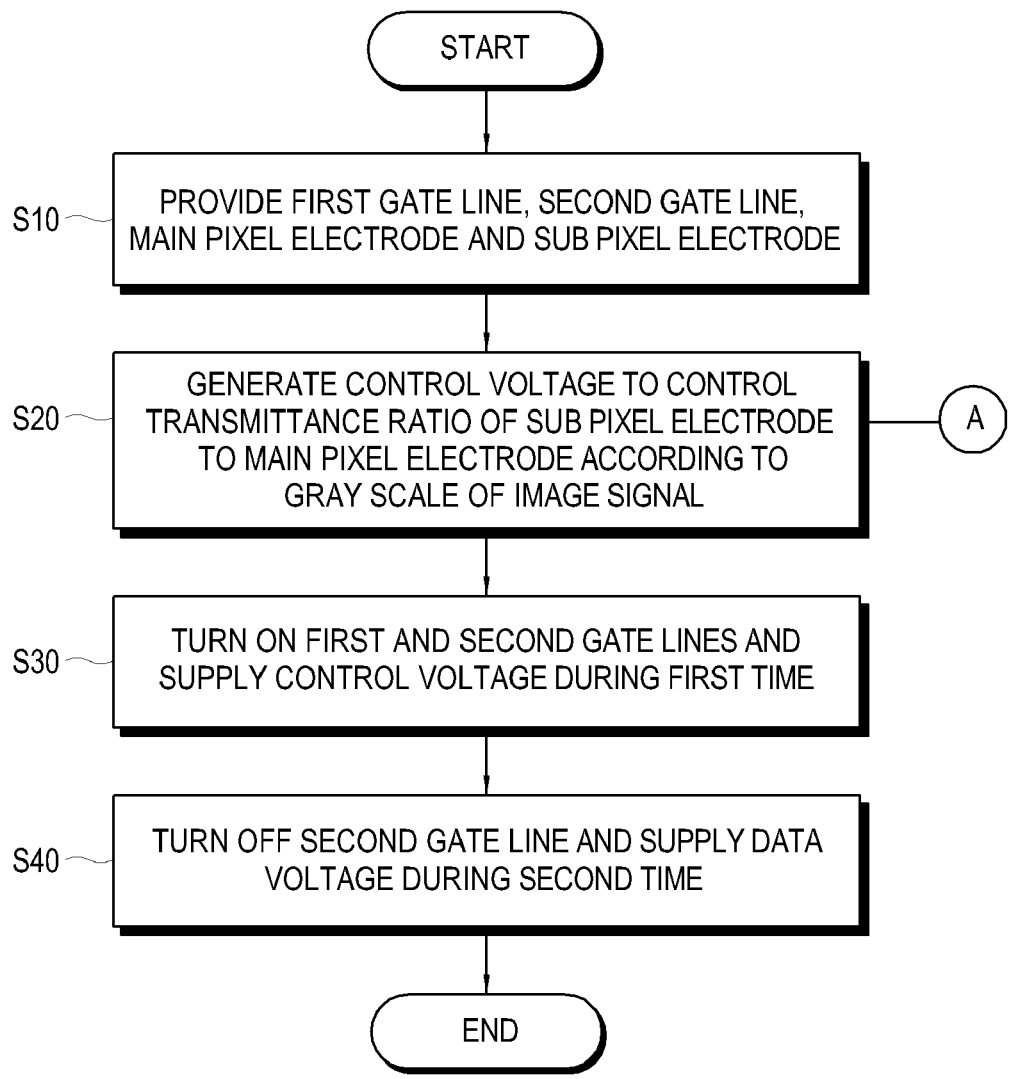
FIG. 9 is a flowchart that shows the control method of the display device of FIG. 1.
Figure 10:
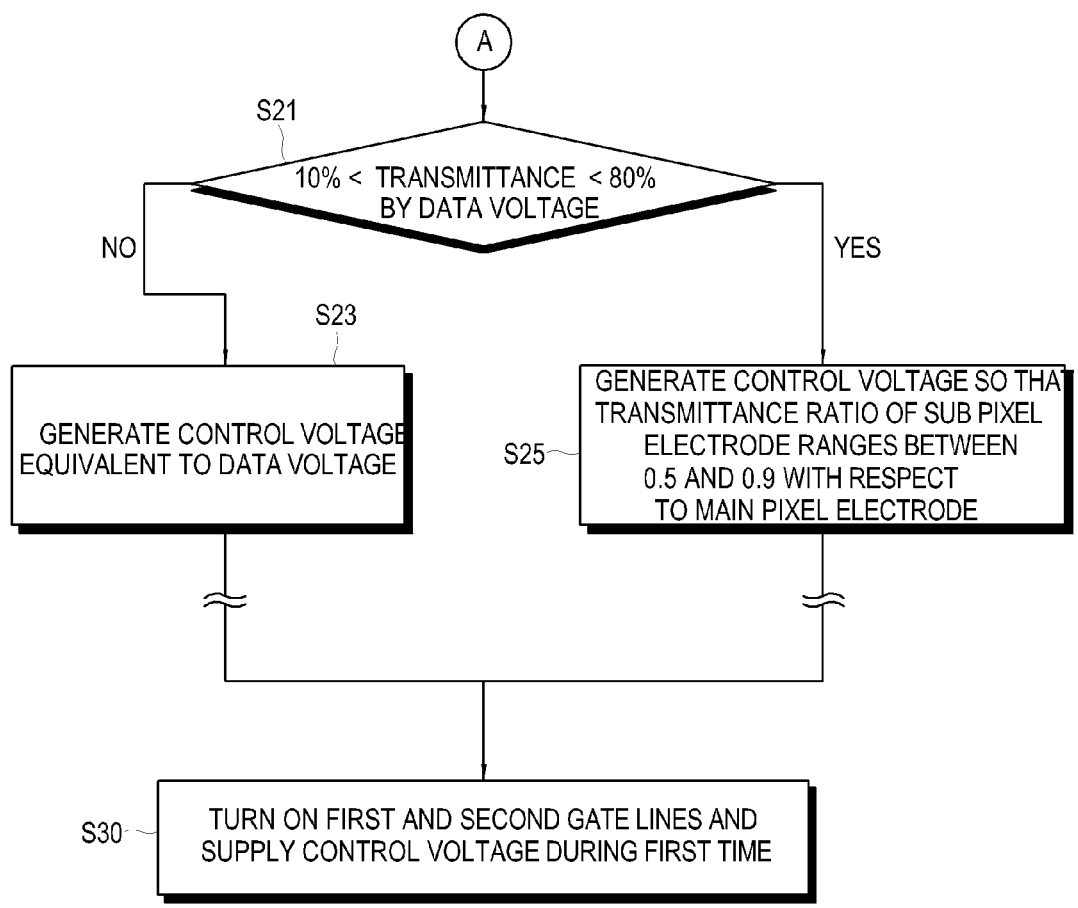
FIG. 10 is a flowchart that shows a method of generating a control voltage according to the display device of FIG. 1.

FIG. 9 is a flowchart that shows a control method of the display device according to the present exemplary embodiment. FIG. 10 is a flowchart that shows a method of generating a control voltage.

First, the display panel 100 is provided (S10). The display panel 100 includes the pixel I having the first gate line 220, the second gate line 221, the main pixel electrode 271, and the sub pixel electrode 272.

When an image signal is input, the signal controller 550 generates the control voltage to change the transmittance ratio of the sub pixel electrode 272 to the main pixel electrode 271 according to the gray scale of the image signal. As shown in FIG. 10, the signal controller 550 determines whether the transmittance ranges from 10% to 80% by the data voltage of the image signal (S21).

If it is determined that the transmittance by the data voltage is 10% and below or 80% and above, i.e. if the image signal is in the low gray scale or in the high gray scale, the signal controller 550 generates the control voltage A equivalent to the data voltage B (S23).

If the transmittance by the data voltage is between 10% to 80%, i.e. if the image signal is in the intermediate gray scale, the signal controller 550 generates the control voltage A so that the transmittance ratio of the sub pixel electrode 272 to the main pixel electrode 271 is 0.5 to 0.9 (S25). The transmittance ratio of the sub pixel electrode 272 to the main pixel electrode 271 is controlled by the compensation value, which is the average value of the control voltage and the data voltage.

Returning to FIG. 9, the signal controller 550 controls the gate driver 510 to supply the gate signal to activate the first and second gate lines 220 and 221 during the first time $T_1$ and controls the data driver 530 to supply the control voltage A (S30). Then the signal controller 550 controls the gate driver 510 to turn off second gate line 221 after the first time $T_1$ and during the second time $T_2$ and controls the data driver 530 to supply the data voltage B (S40).

Figure 11A:
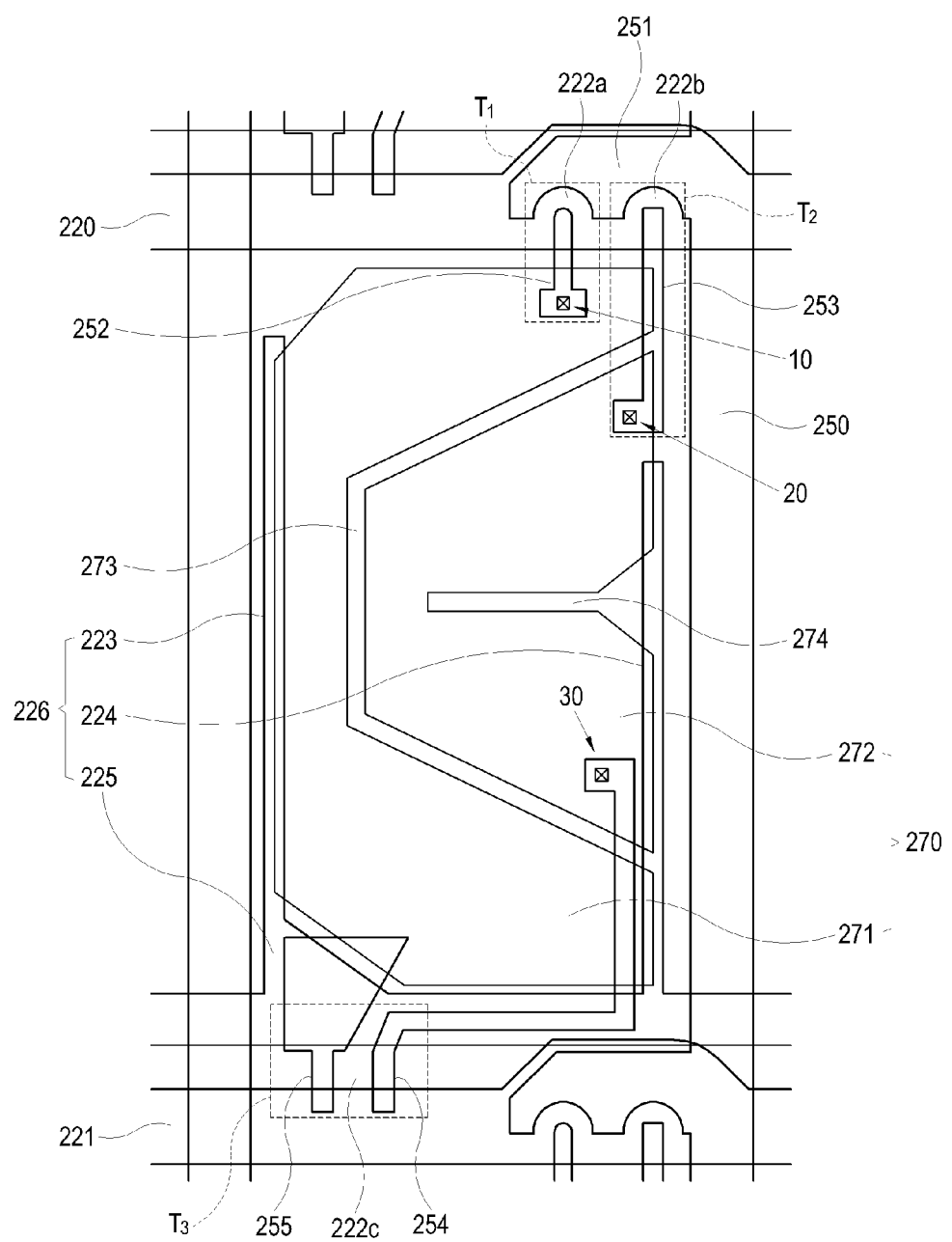
FIG. 11A is a plan view of a display device according to another exemplary embodiment of the present invention.
Figure 11B:
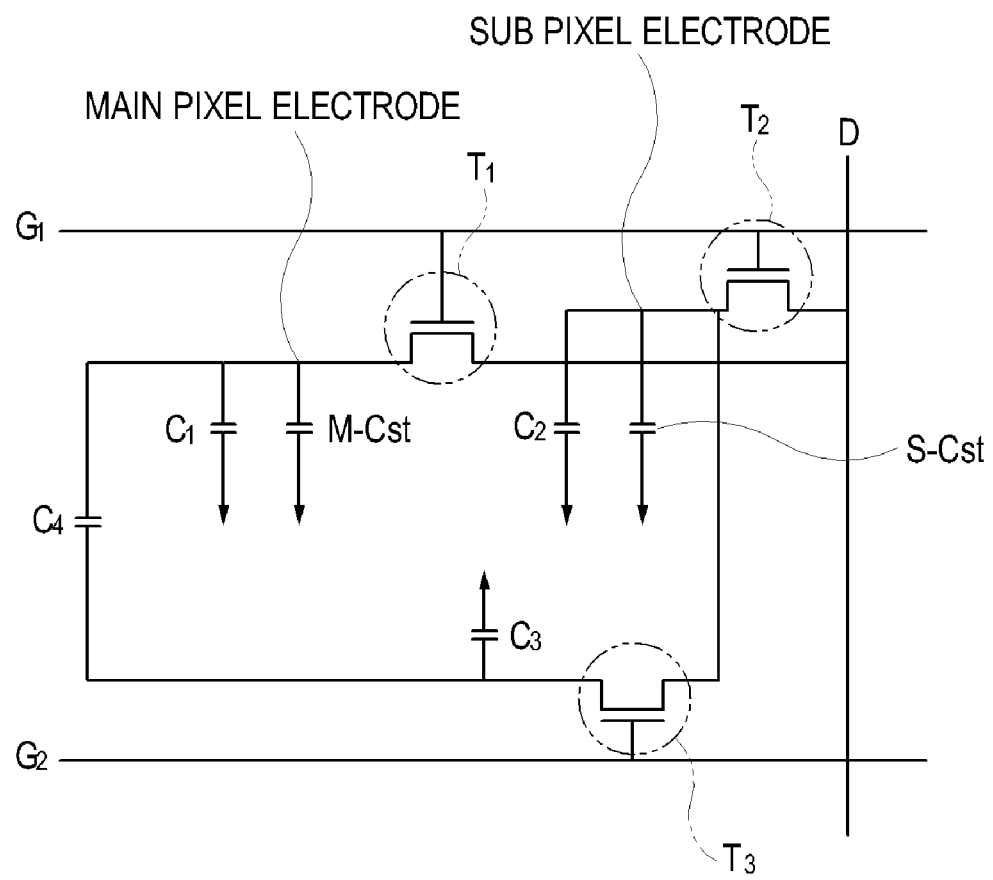
FIG. 11B is an equivalent circuit diagram of a pixel of FIG. 11A.

FIG. 11A is a plan view of a display device according to another exemplary embodiment of the present invention. FIG. 11B is an equivalent circuit diagram of the pixel in FIG. 11A.

As shown therein, the pixel I according to the present exemplary embodiment includes a drain electrode 255 of a third thin film transistor T3. The drain electrode 255 overlaps a main pixel electrode 271. The main pixel electrode 271 and the drain electrode 255 form a fourth storage capacitor C4. A pixel voltage of the main pixel electrode 271 is changed by the fourth storage capacitor C4. The foregoing control method may be applicable to the pixel I according to the present exemplary embodiment. The display panel 100 may include one of the pixels in FIG. 3A and FIG. 10A depending on required visibility.

As described above, exemplary embodiments of the present invention provide a display device that may have improved visibility and transmittance, and a control method thereof.

It will be apparent to those skilled in the art that various modifications and variation can be made in the present invention without departing from the spirit or scope of the invention. Thus, it is intended that the present invention cover the modifications and variations of this invention provided they come within the scope of the appended claims and their equivalents.

What is claimed is:

1. A display device, comprising:
    a first gate line and a second gate line that extend in parallel with each other;
    a data line crossing the first gate line and the second gate line and forming a pixel region with the first gate line and the second gate line;
    a first thin film transistor connected to the first gate line and the data line;
    a second thin film transistor connected to the first gate line and the data line;
    a pixel electrode disposed in the pixel region and comprising a main pixel electrode and a sub pixel electrode, the main pixel electrode and the sub pixel electrode being respectively connected to the first thin film transistor and the second thin film transistor;
    a control thin film transistor connected to the second gate line and the sub pixel electrode; and
    a gate driver to output a first gate signal to the first gate line and a second gate signal to the second gate line, the first gate signal to activate the first gate line during a first time and a second time following the first time, and the second gate signal to activate the second gate line during the first time but not the second time.

2. The display device of claim 1, wherein
    the first thin film transistor comprises a control terminal connected to the first gate line and an output terminal connected to the main pixel electrode,
    the second thin film transistor comprises a control terminal connected to the first gate line and an output terminal connected to the sub pixel electrode,
    the main pixel electrode and the sub pixel electrode are divided by a pixel electrode cutting pattern, and
    a control terminal of the control thin film transistor is connected to the second gate line and an input terminal of the control thin film transistor is connected to the sub pixel electrode.

3. The display device of claim 1, wherein the first time is 0.1 to 0.9 times the combined time of the first time and the second time.

4. The display device of claim 1, further comprising a data driver to supply a control voltage during the first time and a data voltage during the second time, the control voltage controlling a transmittance ratio of the sub pixel electrode to the main pixel electrode.

5. The display device of claim 4, wherein the transmittance ratio of the sub pixel electrode to the main pixel electrode changes depending on a gray scale of an image signal.

6. The display device of claim 5, wherein the transmittance ratio of the sub pixel electrode to the main pixel electrode is proportional to a ratio of a compensation value to the data voltage, the compensation value being an average value of the control voltage and the data voltage.

7. The display device of claim 5, wherein the transmittance ratio of the sub pixel electrode to the main pixel electrode in an intermediate gray scale is smaller than that in the highest gray scale.

8. The display device of claim 5, wherein the transmittance ratio of the sub pixel electrode to the main pixel electrode in an intermediate gray scale is smaller than that in the lowest gray scale.

9. The display device of claim 5, wherein the data driver supplies the control voltage having a magnitude different from the data voltage when the data voltage supplied to the pixel electrode corresponds to 0% to 80% transmittance.

10. The display device of claim 9, wherein a difference of the control voltage from a reference voltage is less than a difference of the data voltage from the reference voltage.

11. The display device of claim 10, wherein the transmittance ratio of the sub pixel electrode to the main pixel electrode is 0.5 to 0.9.

12. The display device of claim 5, wherein the data driver supplies the control voltage equivalent to the data voltage when the data voltage supplied to the pixel electrode corresponds to 80% to 100% transmittance.

13. The display device of claim 5, wherein the data driver supplies the control voltage equivalent to the data voltage when the data voltage supplied to the pixel electrode corresponds to 0% to 10% transmittance.

14. The display device of claim 1, further comprising a storage electrode, wherein the control thin film transistor further comprises a drain electrode, and the drain electrode at least partially overlaps the storage electrode.

15. The display device of claim 1, further comprising a passivation layer, wherein the control thin film transistor further comprises a drain electrode that overlaps the main pixel electrode, and the passivation layer is disposed between the drain electrode and the main pixel electrode.

* * * * *